Sept. 27, 1966   T. E. MOYERS ETAL   3,275,046
PORTABLE PULPWOOD CUT-OFF AND LOADING MACHINE
Filed May 11, 1964   4 Sheets-Sheet 1

INVENTORS
T. Ezell Moyers
H. C. Moyers
Ashton P. Moyers
BY William S. Dorman
ATTORNEY INVENTORS
T. Ezell Moyers
H. C. Moyers
Ashton P. Moyers
BY
William S. Dorman
ATTORNEY

United States Patent Office 3,275,046
Patented Sept. 27, 1966

1

3,275,046
PORTABLE PULPWOOD CUT-OFF
AND LOADING MACHINE
Thomas Ezell Moyers, Hugh C. Moyers, and Ashton P. Moyers, all of Rte. 1, Montrose, Ark.
Filed May 11, 1964, Ser. No. 366,525
5 Claims. (Cl. 143—46)

The present invention relates to a portable cut-off and loading machine used in the harvesting of timber for the pulpwood and paper industries.

Heretofore, the harvesting of timber has been essentially a manual operation. That is, after the trees are felled, the tops and individual branches are lopped off by means of small portable gasoline-powered chain saws. Thereafter, the tree lengths are cut into the desired length on the spot using the same portable powered saws. The cut "sticks" are then collected by hand and piled in a pallet. The above mentioned operation is time consuming and quite strenuous.

It is recognized that certain proposals have been put forward in the past with a view towards providing a somewhat automatic operation in this particular field. For example, Montague Patent No. 2,517,016 discloses a machine of the automatic type. From the side of the Montague machine, there is an elongated transversely extending track upon which is mounted a movable dolly for the purpose of feeding logs into the Montague machine. The difficulties involved in moving the track and the machine together and realigning them at a new location result in the fact that the Montague machine does not possess all the desired attributes of portability that it might otherwise have.

Therefore, it is a principal object of the present invention to provide a machine which will speed the harvesting of hard and soft pulpwood while reducing the laborious nature of the work involved.

A further object of the present invention is to provide a machine which is easily and readily portable so that it can be moved through log trails and be operational immediately on site.

A further object of the present invention is to provide a machine of the type described above where means are provided to maintain a proper holding action on the log during the cutting operation even when the log has become relatively small with respect to its initial tree length.

It is a still further object of the present invention to provide a safety device in the form of an ejecting means for removing, from the elevator conveyor, any sticks which become misaligned as they are picked up by the elevator conveyor.

Other and further objects and advantageous features of the present invention will hereinafter more fully appear in connection with a detailed description of the drawings in which:

FIGURE 5 is a fragmentary sectional view taken on section line 5—5 of FIGURE 3, showing principally the pivotal supporting plate which is used for supporting the last portion of the tree length to be cut;

2

Figure 1:
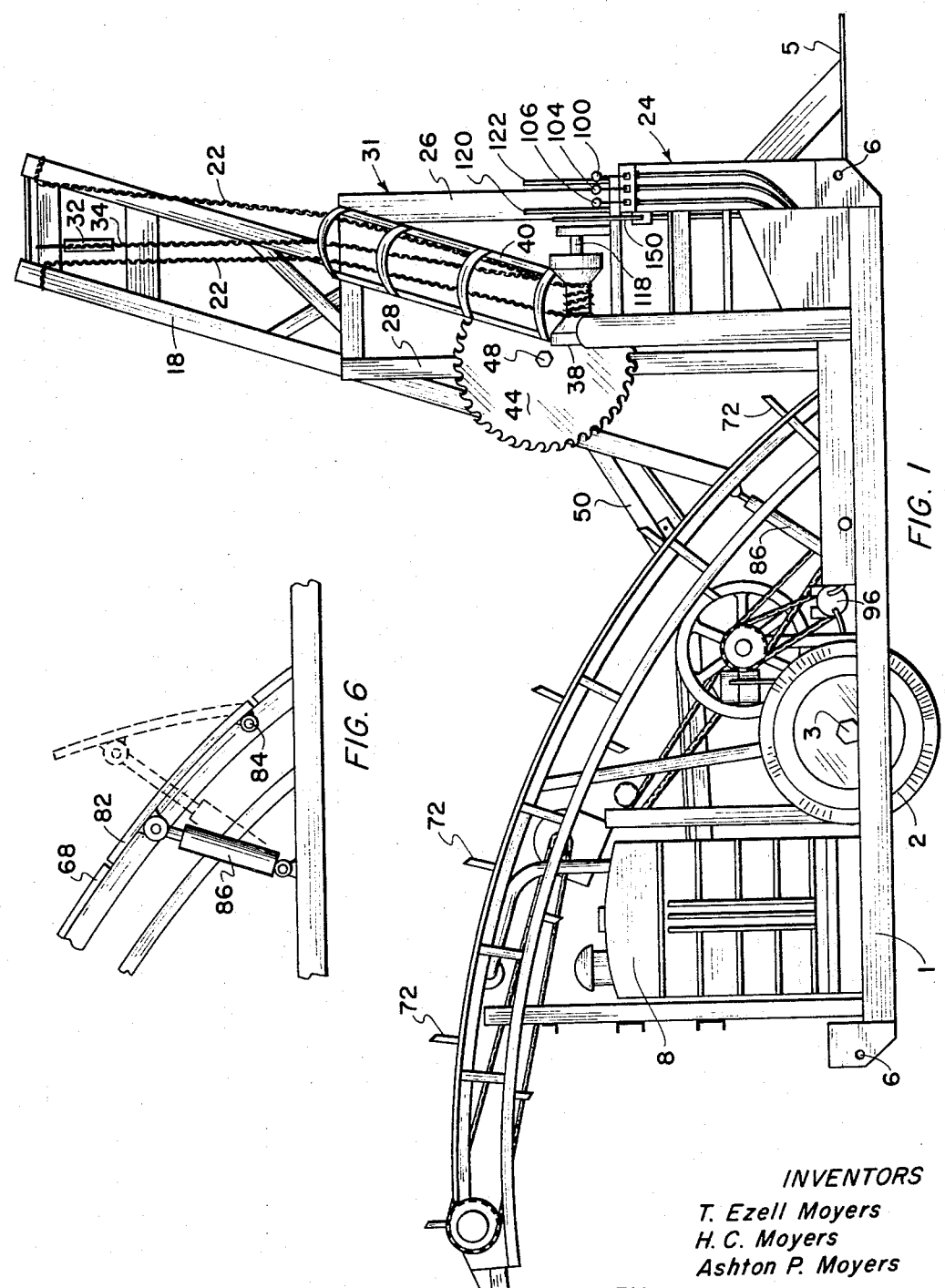
FIGURE 1 is a side elevation of our new pulpwood cut-off and loading machine as viewed from the operating side.
Figure 2:
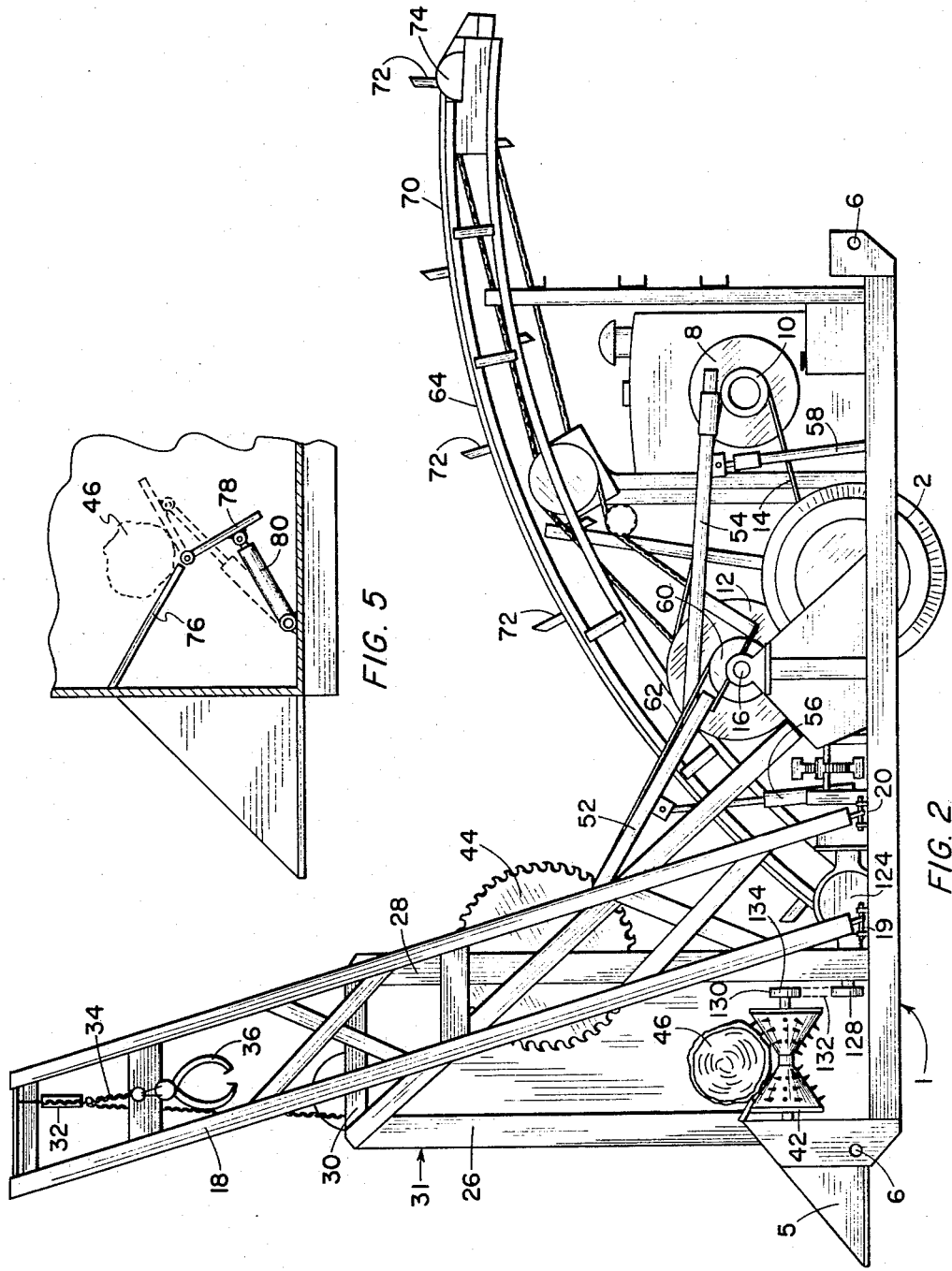
FIGURE 2 is a side elevation of our machine viewed from the opposite side from FIGURE 1.
Figure 3:
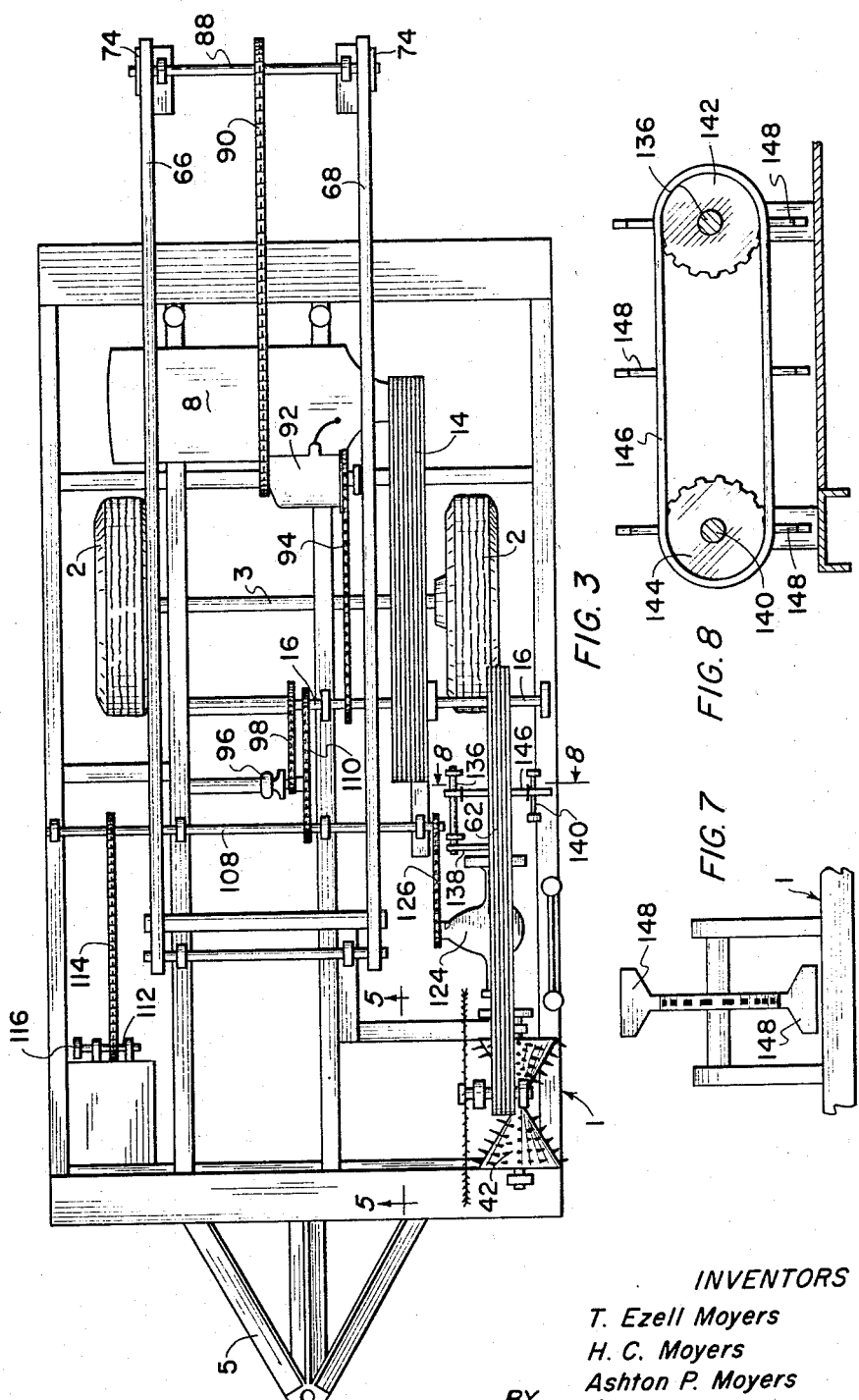
FIGURE 3 is a plan view of our machine with certain parts removed principally to show the manner in which the power is transmitted from the prime mover to the various portions of our machine.

FIGURE 6 is a fragmentary sectional view showing further details of the ejector plate shown in FIGURE 1;

FIGURE 7 is a fragmentary detailed view, on a slightly larger scale, of the saw dust remover shown in FIGURE 2;

FIGURE 8 is a fragmentary sectional view, on a somewhat larger scale, taken along section line 8—8 of FIGURE 3 showing the saw dust remover in side elevation.

Referring to the drawings in detail, the machine illustrated therein has a substantially rectangular base frame 1 formed from suitable structural elements such as I-beams, C-channels or the like. A pair of wheels 2 are mounted on a solid axle 3 which is secured to the intermediate frame structure by welding or other suitable means. The left hand end of the frame 1, as it appears in FIGURE 3, is provided with a tow hitch 5 to permit towing by a tractor or other motive vehicle. The frame is also provided with suitable holes 6 at various points on the frame to permit the attachment of chain hooks (not shown) or cables (not shown) for dragging or skidding of the machine. In this regard, it should be understood that the bottom surface of the frame is covered, as far as possible, with solid flat plates such that, even under extremely muddy conditions the frame will rest on the surface of the ground similar to a flat sled which can then be dragged to any desired location by using chains and cables in the manner suggested above.

Mounted on the frame 1 is a power unit 8, preferably a diesel engine. A pulley 10 is keyed to the output shaft of the motor 8 and is connected in driving relation with a larger pulley 12 by means of a plurality of parallel V-belts 14. The pulley 12 is keyed to a main drive shaft 16 which extends substantially entirely across the transverse width of the frame as best shown in FIGURE 3. The main drive shaft 16 is suitably journalled at various locations along its length, as will hereinafter appear. All of the remaining driven components yet to be described are driven from the main drive shaft 16.

Figure 4:
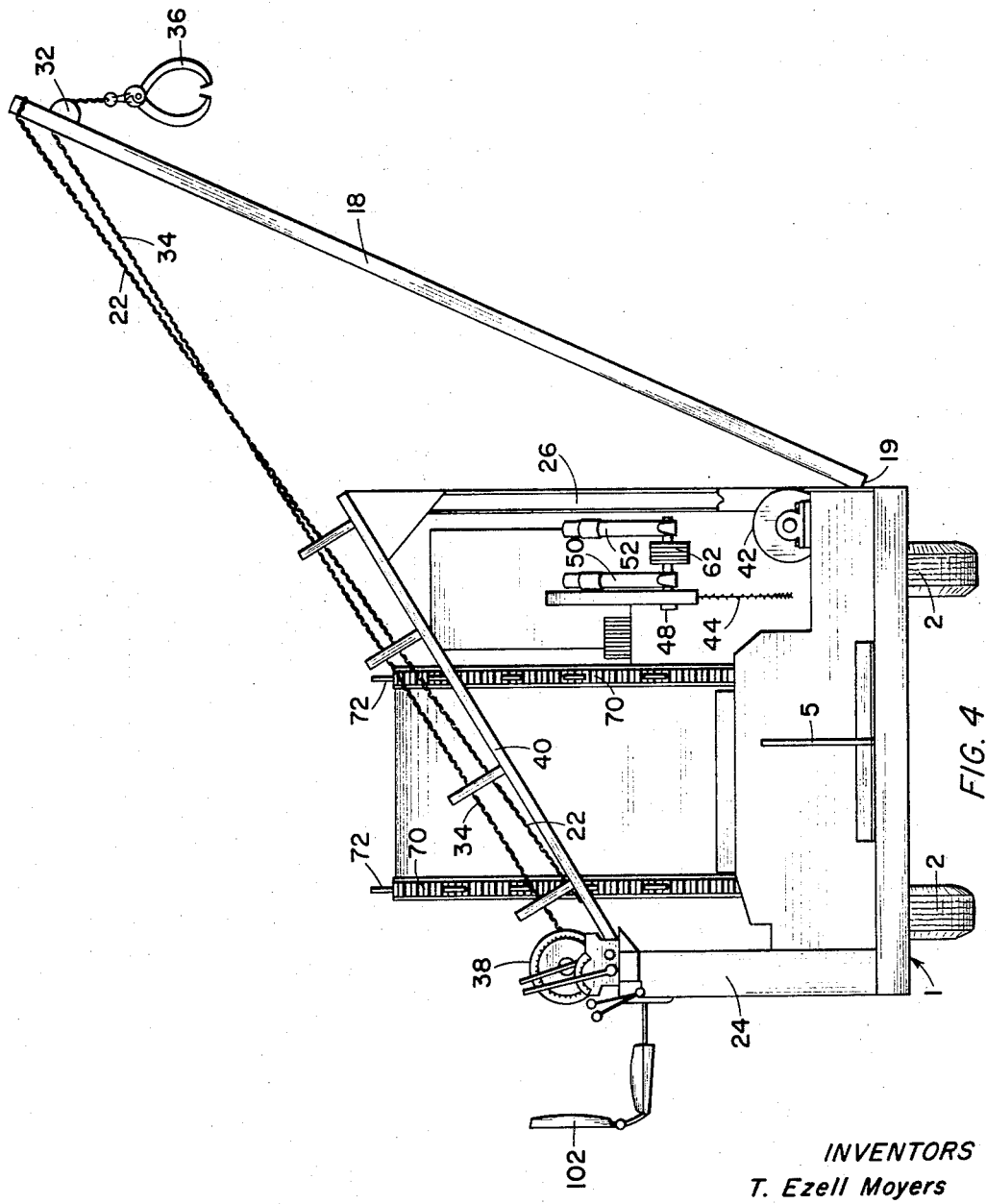
FIGURE 4 is an end view taken from the cutting side of our machine.

To one side of the frame 1 is disposed a somewhat angularly oriented boom 18 whose lower end is pivotally mounted to the frame at 19 and 20. The boom 18 is held in the outward position shown in FIGURE 4 by means of a cable 22 which is anchored at its upper end to the upper end of the boom and which is secured at its lower end to a vertical stand 24. Just to the left of the boom 18, as it appears in FIGURE 4, are a pair of uprights 26 and 28 which are welded at their lower ends to the frame 1 and which are provided with suitable transverse cross braces 30 so as to form a vertical support, generally designated by the reference character 31. In transit, the boom 18 is pivotted in a counter clockwise direction (with respect to FIGURE 4) such that it will lie against the vertical support 31. The cable 22 can be wound up at its lower end or at its upper end and, preferably, additional cable or rope is latched around the boom 18 and the vertical support 31 to hold the boom in proper position during movement of the machine.

At the upper end of the boom 18, there is mounted a pulley 32 over which passes a movable cable 34. A pair of tongs 36 are attached to the outer free end of the cable 34 whereas the inner and lower end of the cable 34 is wound around a substantially conventional winch 38 which is mounted for rotation at the upper end of the vertical stand 24. The manner in which the winch 38 is powered will be described hereinafter. The cables 22 and 34 pass through a suitable guard 40 which extends between the vertical stand 24 and the vertical support 31.

When the winch 38 is rotated in such a direction as to pay out the cable 34, the tongs 36 can be lowered in position to grasp a log; thereafter, the winch 38 is rotated in the opposite direction to feed the log to the machine as will hereinafter appear.

Logs of tree length are thus carried by the tongs 36 and cable 34 and are manipulated into position so as to engage a spiked feed roller 42. The manner in which the feed roller is driven will be described hereinafter; however, the feed roller 42 will rotate so as to bring the log towards the machine until the forward end of the log abuts against the adjacent portion of the vertical stand 24. Thereafter, a rotating saw 44 will be urged downwardly in a manner later to be described to sever off a "stick" 46 of a length equal to the distance between the vertical stand 24 and the saw 44. This length is preferably approximately five feet, but, of course, the distance can be made any desired length by changing the distance between the vertical stand 24 and the saw 44. After the saw 44 has cut through the large log, the saw is retracted in a manner later to be described, the severed portion 46 is allowed to fall out of position and the spiked feed roller 42 moves the log forward again until the freshly cut end abuts the adjacent portion of the vertical stand 24; the saw 44 is lowered again and the process is repeated until the entire log is cut up into substantially equal five foot lengths.

The saw 44 is of the circular type and is rotatably mounted on a shaft 48 which is journalled at the outer ends of a pair of arms 50 and 52. The arms 50 and 52, which constitute a frame support for the saw 44 are freely pivotally mounted at their lower ends on the main shaft 16. The aforementioned saw frame is provided with counter balanced extensions 54 which together with the arms 50 and 52 form a composite arm which is pivotally mounted at its center on the shaft 16. A first hydraulic cylinder 56 is mounted between the frame 1 and the arms 50 and 52. A second hydraulic cylinder 58 is mounted between the frame 1 and the extensions 54. The means for supplying hydraulic fluid to the cylinders 56 and 58 will be described hereinafter; briefly stated, however, the cylinders 56 and 58 are worked in opposition to each other such that when it is desired to move the saw 44 downwardly for the cutting action, the cylinder 56 is retracted and the cylinder 58 is extended. When it is desired to lift the saw 44 away from the log the reverse condition is true with respect to the cylinders 56 and 58.

A multiple pulley 60 is keyed to the main line shaft 16 between the inner ends of the arms 50 and 52. A multiple V-belt 62 passes around the pulley 60 and a similar pulley (not shown) keyed to the saw shaft 48.

The machine is further provided with an arcuately oriented loading elevator unit 64 which extends from its lower end at a point adjacent the place where the logs are cut to an upper position overhanging one end of the frame 1. The elevator unit is comprised of a pair of spaced arcuate guide rails 66 and 68 around which move a pair of endless chains 70. Each of the chains 70 is provided with a plurality of outwardly projecting cleats or lugs 72 which are adapted to engage a severed log or stick at the lower end of the elevator and convey the log up to the top of the elevator and discharge the same over the outer end of the elevator onto a suitable pallet or the like which is positioned beneath the overhang. The chains 70 are driven by suitable sprockets 74 mounted at the upper end of the elevator conveyor and are further provided with additional idler sprockets (not shown) along the span of the elevator. The space between the two guide rails 66 and 68 is filled with a flat sheet insofar as possible to prevent scraps of bark, etc., from falling down onto the machine in the space between the guide rails and also for the further purpose of providing a relatively smooth surface over which the cut logs can be moved.

As best shown in FIGURE 5, while the log 46 is being cut, it rests on an inclined table or plate 76 extending transversely between the spiked roller 42 and the vertical stand 24. When the log is sufficiently long, there is relatively little chance of misalignment on the table 76 because the length of the log itself will almost assure that the relative center line of the log will be substantially parallel to the end of the machine. However, when the log becomes relatively shorter due to the cutting off of successive sticks from the log, some difficulty has been observed with the last portion of the log to be cut, particularly the very last section to be cut. For example, it has been noted that there is a tendency for the log to slip downwardly on the plate 76 towards the elevator such that it would otherwise be difficult to provide a cut which would be substantially transverse to the center line of the log. For this purpose of preventing the above, there is provided a hinged plate 78 which normally occupies the solid line position shown in FIGURE 5, but which, when the last section of the log 46 is being cut can be moved to the dotted line position shown in FIGURE 5, by means of the hydraulic cylinder 80. The pivotal plate 78 is held in the dotted line position shown in FIGURE 5 during the period of time that the last portion of the log 46 is being cut; however, after the cut on this last section, the hydraulic pressure is released from the cylinder 80, allowing the plate 78 to return to its dotted line position, so that the severed stick can drop from the plate 76 into position to be picked up by the conveyor 64.

Another problem which has presented itself in the operation of this machine is that occasionally a stick will tend to become misaligned on the elevator; for example, it is possible that a cleat 72 on one chain 70 will engage one end of the stick before the opposite cleat 72 on the other chain 70 engages the other end of the stick. Therefore, the stick will tend to go up the elevator at an angle and, of course, there is an ever present danger that the stick will slide off to one side or the other thereby creating a hazard for anyone working in the area of the machine.

Therefore, in order to prevent any misalignment of the stick on the elevator 64, there is an ejector plate 82 provided, such as shown in FIGURE 6. The plate 82 spans the distance between the guide rails 66 and 68 adjacent the lower portion of the elevator 64. The ejector plate 82 is pivotally mounted at its lower end as at 84. The hydraulic cylinder 86 is pivotally mounted at its lower end on the frame 1 and at its upper end of the ejector plate 82. When the operator notices that one of the sticks has become misaligned in starting up the elevator 64 he moves a suitable lever, later to be described, so as to actuate the hydraulic cylinder 86 moving the ejector plate 82 to the dotted line position shown in FIGURE 6. The result of this movement will cause the misaligned stick to be ejected completely from the elevator portion from whence it will fall back onto the frame in a position to be reengaged by the lugs 72.

Turning now to FIGURE 3, the drive for the elevator chain 70 is provided as follows: The sprockets 74 are keyed to a shaft 88 which has a central sprocket (not shown) also keyed thereto. A chain 90 passes around the central sprocket on the shaft 88 and also around another sprocket (not shown) on a gear reduction unit 92. At the opposite end of the gear reduction 92, there is a driving sprocket (not shown) around which passes a chain 94. The other end of the chain 94 is driven by a sprocket (not shown) keyed to the center of the main drive shaft 16.

The operation of the hydraulic system is briefly as follows: A hydraulic pump 96 is mounted on the frame 1. The input shaft to the hydraulic pump 96 is provided with a sprocket (not shown) which is driven by a chain 98 passing around a corresponding sprocket (not shown) on the main drive shaft 16. The hydraulic pump has inlet and outlet lines which are connected by means of conventional hydraulic circuitry to the hydraulic cylinders and pistons shown herein and to a conventional reservoir (not shown) utilized for the return of hydraulic fluid. With particular regard to FIGURE 1, however, the cylinders 56 and 58 which are employed for raising and lowering the saw 44 are controlled by the lever 100 adjacent the operator seat 102 (see FIGURE 4). The center lever 104 controls the hydraulic cylinder 80 for the pivotal plate 78 shown in FIGURE 5. The left hand lever 106 controls the hydraulic cylinder 86 for the ejector plate 82 shown in FIGURE 6.

The power for driving the winch 38 will be briefly described as follows: The main shaft 16 drives an auxiliary line shaft 108 by means of the chain 110 which passes around suitable sprockets (not shown) keyed to the shafts 16 and 108, respectively. At the upper end of FIGURE 3, the shaft 108 drives a stub shaft 112 by means of a chain 114 which passes around suitable sprockets (not shown) keyed to the shafts 108 and 112, respectively. The stub shaft 112 is suitably journalled to the frame in a position substantially beneath the winch 38. A sprocket 116 is keyed to the shaft 112 and drives the shaft 118 upon which the winch 38 is mounted by means of a chain (not shown). Power from the shaft 118 is actually coupled to the winch 38 by means of the clutch lever 120. Similarly, the winch 38 is stopped or held in fixed position by means of the brake lever 122.

The drive to the spiked feed roller will now be briefly described as follows: The lower end of shaft 108 drives the input to a differential gear box 124 by means of a chain 126 which passes around suitable sprockets keyed to the shaft 108 and the input to the differential 124, respectively. The output at the left of the differential 124 is provided with a sprocket 128 which drives a sprocket 130 by means of the chain 132 (shown in dotted lines in FIGURE 2). The sprocket 130 is keyed to a shaft 134 upon which the spiked feed roller 42 is also keyed. The right hand output of the differential 124 is also provided with a sprocket (not shown) which drives another sprocket (not shown) on a horizontal shaft 136 by means of the chain 138. The shaft 136 is journalled for rotation at a level slightly above the upper level of the frame 1 in parallel relation with another shaft 140 which is similarly journalled adjacent the outer edge of the frame 1.

As best shown in FIGURE 8, the shaft 136 has keyed thereto sprocket 142 whereas the shaft 140 has keyed thereto the sprocket 144. An endless chain 146 passes around the sprockets 142 and 144. A series of transversely extending scraper plates 148 are mounted in spaced relation and connected to the links on the chain in the manner shown in FIGURES 7 and 8 to provide a saw dust remover of the drag-scraper type. With regard to FIGURES 7 and 8, it should be noted that the scraper plates 148 terminate at their lower edges adjacent the base or floor on the frame structure of the machine. The purpose of this arrangement is as follows: The saw blade will be normally rotating in the direction shown by the arrow in FIGURE 2 such that the saw dust will be directed towards the right in FIGURE 2. The saw dust, therefore, will be deposited in substantially the area occupied by the saw dust remover of FIGURES 7 and 8. If the saw dust remover is driven in the direction shown by the arrow in FIGURE 8, the scrapers 148 will scrape the saw dust and deposit the same over the side and onto the ground thereby preventing an unnecessary pile up of saw dust on the floor of the machine.

Under normal operating conditions, means (not shown) will be provided to insert a small amount of friction on the left hand output (as it appears in FIGURE 2) of the differential 124. The effect of this friction is that the spiked roller 42 will not be driven but the drive will actually pass through the differential 124 to the saw dust remover in FIGURES 7 and 8. Now, when it is desired to operate the feed roller 42, a braking means (not shown) is applied to the right hand side (as it appears in FIGURE 2) of the differential 124 thereby stopping the operation of the saw dust remover during the period of time that the roller 42 is operated. Thus, returning to FIGURE 1, the lever 150 is provided to permit a braking force to be applied to the saw dust remover thereby driving the feed roller; conversely, releasing the handle 150 will stop the operation of the feed roller 32 and will permit the saw dust remover to operate thereafter.

*Operation*

The workers in a given area will cut down the trees, lop off the tops and cut off the side branches so as to produce substantially tree-length logs. The tree length logs are then arranged in substantially parallel relation with each other in a large pile in a clearing. Thereafter, the machine of the present invention is towed or dragged to the clearing and positioned in such a manner that the feed side of the machine, as shown in FIGURE 2, is adjacent one end of the log pile. As the size of the log pile diminishes, as a result of operation of the machine of the present invention, it is a relatively simple matter to move the machine by towing or sliding towards the remainder of the log pile. Since the machine of the present invention does not employ any tracks or dollies as are required in Montague Patent No. 2,517,016, the movement of the machine from one location to another or from different points in the same general location is a relatively easy matter.

Assuming that the machine is in the correct position, the motor 8 is started and the operator positions himself in the seat 102. By proper manipulation of the handles 120 and 122, the cable 34 is payed out until the tongs 36 are in the proper position to be utilized by a helper. The helper will have rolled a log off the pile previously such that the log will now be in substantial alignment with the feed roller 42. The helper will place the tongs 36 on the tree length log substantially midway along the length of the log but, preferably, somewhat closer towards the machine than the actual center of the log. Thereafter, the operator will draw in the cable 34 by manipulation of the handles 120 and 122. At the same time, the helper will guide the forward end of the log so that it properly engages the feed roller 42.

As the forward end of the log engages the feed roller 42, the operator manipulates the lever 150 so as to cause the feed roller 42 to rotate. Immediately thereafter, the log is drawn quickly into the machine such that the forward end bangs against the vertical stand 24. Releasing the pressure on the handle 150 will stop the roller 42 and permit the saw dust remover shown in FIGURES 7 and 8 to operate. Immediately thereafter, the operator moves the handle 100 towards him to move the rotating saw blade 44 towards the log. As indicated previously, the handle 100 is connected by a hydraulic circuit to the hydraulic pump 96 and to the hydraulic cylinders 56 and 58. Thus, pulling the handle 100 towards the operator will cause the cylinder 56 to contract and the cylinder 58 to expand. This action will continue until the saw 44 cuts entirely through the log. Release of the handle 100 thereafter will cause a reverse action in the cylinders 56 and 58 and the saw 44 will be returned to its initial position away from the log. Immediately after the cutting of the saw 44 through the log, the section between the saw and the vertical stand 24 will then immediately fall down towards the elevator to be engaged by the lugs 72 and drawn over the elevator 64 to be discharged from the upper end. In the meantime, another helper will have placed a suitable pallet under the overhang. This second helper will see to it that the logs discharged from the upper end of the conveyor are properly aligned on the pallet. After the pallet is completely filled, it is dragged away and another pallet is positioned in its place.

During the operation of the machine of the present invention, as the log is cut successively so that only a small portion remains, the operator will pull the handle 104 towards him so as to move the pivotal plate 78 to the dotted line position shown in FIGURE 5. As indicated previously, this will assure that the last section will be properly positioned for the last cut. After the saw severs the last section, the handle 104 is released and the last stick is allowed to fall into position to be engaged by the lugs 72 on the elevator conveyor.

Again, if during the operation of this machine the operator notices that one of the sticks is misaligned on the lugs 72, he merely pulls the handle 106 towards him so as to energize the cylinder 86 and move the ejector plate 82 to the dotted line position shown in FIGURE 6. This action will remove the misaligned stick from the elevator conveyor so that it returns to a position at the bottom of the conveyor to be reengaged by the lugs 72 on the conveyor.

Whereas the present invention has been described in particular relation to the drawings attached hereto, it should be understood that other and further modifications apart from those shown herein may be made within the spirit and scope of this invention.

What is claimed is:

1. A portable cut-off and loading machine comprising a base frame, means on said base frame allowing movement thereof to different locations along the ground, an elevator conveyor unit mounted on said frame and extending from a lower position adjacent one end of said frame to an upper position above and beyond the other end of said frame, a first pair of spaced lugs projecting outwardly from said elevator conveyor and movable along said elevator conveyor from the lower end thereof to the upper end thereof in a substantially continuous circuit, a second pair of spaced lugs projecting outwardly from said elevator conveyor and being opposed and arranged in transversely spaced relation with respect to the first pair of lugs and movable from the bottom of said elevator conveyor to the top thereof in a substantially continuous circuit, an inclined table at said one end of said frame and inclined downwardly towards the lower end of said elevator conveyor, a rotatable spiked feed roller at one side of said frame adapted to move a log disposed thereon into said machine, a vertical abutment at the opposite side of said frame from said roller for stopping the advancement of said log, a pivotal saw support having a portion thereof movable towards and away from said log, a rotatable saw blade mounted on the end of said saw support adjacent said log and movable into and out of engagement with said log for cutting through said log, said log thereafter falling off said inclined table onto the elevator conveyor so as to be engaged by the spaced lugs thereon for movement from the lower end of said elevator conveyor to the upper end thereof from whence said log is discharged over the upper end of said elevator conveyor, a boom projecting vertically and transversely outwardly from said one side of said frame, a pulley means mounted to the upper end of said boom, a cable extending over said pulley and having a hook means at the outer free end thereof, a rotatable winch connected with the other end of said cable for winding up or paying out said cable whereby said hook means is engageable with a log for the purpose of directing said log into engagement with said feed roller.

2. A portable cut-off and loading machine comprising a base frame, means on said base frame allowing movement thereof to different locations along the ground, an elevator conveyor unit mounted on said frame and extending from a lower position adjacent one end of said frame to an upper position above and beyond the other end of said frame, a first pair of spaced lugs projecting outwardly from said elevator conveyor and movable along said elevator conveyor from the lower end thereof to the upper end thereof in a substantially continuous circuit, a second pair of spaced lugs projecting outwardly from said elevator conveyor and being opposed and arranged in transversely spaced relation with respect to the first pair of lugs and movable from the bottom of said elevator conveyor to the top thereof in a substantially continuous circuit, an inclined table at said one end of said frame and inclined downwardly towards the lower end of said elevator conveyor, a rotatable spike feed roller at one side of said frame adapted to move a log disposed thereon into said machine, a vertical abutment at the opposite side of said frame from said roller for stopping the advancement of said log, a pivotal support having a portion thereof movable towards and away from said log, a rotatable saw blade mounted on the end of said support adjacent said log and movable into and out of engagement with said log for cutting through said log, a pivotal plate positioned between said inclined table and the lower end of said elevator conveyor, means for moving said pivotal plate relative to said inclined table for forming therewith a V-trough for supporting said log during the cutting thereof, said plate moving means pivoting said plate downwardly after the cutting of said log, said log thereafter falling off said inclined table onto the elevator conveyor so as to be engaged by the spaced lugs thereon for movement from the lower end of said elevator conveyor to the upper end thereof from whence said log is discharged over the upper end of said elevator conveyor, a boom projecting vertically and transversely outwardly from said one side of said frame, a pulley means mounted to the upper end of said boom, a cable extending over said pulley and having a hook means at the outer free end thereof, a rotatable winch connected with the other end of said cable for winding up or paying out said cable whereby said hook means is engageable with a log for the purpose of directing said log into engagement with said feed roller.

3. A portable cut-off and loading machine comprising a base frame, means on said base frame allowing movement thereof to different locations along the ground, an elevator conveyor unit mounted on said frame and extending from a lower position adjacent one end of said frame to an upper position above and beyond the other end of said frame, a first pair of spaced lugs projecting outwardly from said elevator conveyor and movable along said elevator conveyor from the lower end thereof to the upper end thereof in a substantially continuous circuit, a second pair of spaced lugs projecting outwardly from said elevator conveyor and being opposed and arranged in transversely spaced relation with respect to the first pair of lugs and movable from the bottom of said elevator conveyor to the top thereof in a substantially continuous circuit, an inclined table at said one end of said frame and inclined downwardly towards the lower end of said elevator conveyor, a rotatable spiked feed roller at one side of said frame adapted to move a log disposed thereon into said machine, a vertical abutment at the opposite side of said frame from said roller for stopping the advancement of said log, a pivotal support having a portion thereof movable towards and away from said log, a rotatable saw blade mounted on the end of said support adjacent said log and movable into and out of engagement with said log for cutting through said log, said log thereafter falling off said inclined table onto the elevator conveyor so as to be engaged by the spaced lugs thereon for movement from the lower end of said elevator conveyor to the upper end thereof from whence said log is discharged over the upper end of said elevator conveyor, a pivotal ejector plate mounted between said first and second pairs of lugs adjacent the lower end of said elevator conveyor, means for moving said pivotal ejector plate outwardly with respect to said elevator conveyor for ejecting therefrom any log passing over said pivotal ejector plate, a boom projecting vertically and transversely outwardly from said one side of said frame, a pulley means mounted to the upper end of said boom, a cable extending over said pulley and having a hook means at the outer free end thereof, a rotatable winch connected with the other end of said cable for winding up or paying out said cable whereby said hook means is engageable with a log for the purpose of directing said log into engagement with said feed roller.

4. A portable cut-off and loading machine comprising a base frame, means on said base frame allowing movement thereof to different locations along the ground, an elevator conveyor unit mounted on said frame and extending from a lower position adjacent one end of said frame to an upper position above and beyond the other end of said frame, a first pair of spaced lugs projecting outwardly from said elevator conveyor and movable along said elevator conveyor from the lower end thereof to the upper end thereof in a substantially continuous circuit, a second pair of spaced lugs projecting outwardly from said elevator conveyor and being opposed and arranged in transversely spaced relation with respect to the first pair of lugs and movable from the bottom of said elevator conveyor to the top thereof in a substantially continuous circuit, an inclined table at said one end of said frame and inclined downwardly towards the lower end of said elevator conveyor, a rotatable spiked feed roller at one side of said frame adapted to move a log disposed thereon into said machine, a vertical abutment at the opposite side of said frame from said roller for stopping the advancement of said log, a pivotal saw support having a portion thereof movable towards and away from said log, a rotatable saw blade mounted on the end of said saw support adjacent said log and movable into and out of engagement with said log for cutting through said log, said log thereafter falling off said inclined table onto the elevator conveyor so as to be engaged by the spaced lugs thereon for movement from the lower end of said elevator conveyor to the upper end thereof from whence said log is discharged over the upper end of said elevator conveyor, a boom projecting vertically and transversely outwardly from said one side of said frame, a pulley means mounted to the upper end of said boom, a cable extending over said pulley and having a hook means at the outer free end thereof, a rotatable winch connected with the other end of said cable for winding up or paying out said cable whereby said hook means is engageable with a log for the purpose of directing said log into engagement with said feed roller, and a saw dust remover mounted along said one side of said frame, said saw dust remover having a continuous chain of the drag-scraper type, and means for moving said chain in alternation with the rotation of said feed roller.

5. A portable cut-off and loading machine comprising a base frame, means on said base frame allowing movement thereof to different locations along the ground, an elevator conveyor unit mounted on said frame and extending from a lower position adjacent one end of said frame to an upper position above and beyond the other end of said frame, a first pair of spaced lugs projecting outwardly from said elevator conveyor and movable along said elevator conveyor from the lower end thereof to the upper end thereof in a substantially continuous circuit, a second pair of spaced lugs projecting outwardly from said elevator conveyor and being opposed and arranged in transversely spaced relation with respect to the first pair of lugs and movable from the bottom of said elevator conveyor to the top thereof in a substantially continuous circuit, an inclined table at said one end of said frame and inclined downwardly towards the lower end of said elevator conveyor, a rotatable spiked feed roller at one side of said frame adapted to move a log disposed thereon into said machine, a vertical abutment at the opposite side of said frame from said roller for stopping the advancement of said log, a pivotal saw support having a portion thereof movable towards and away from said log, a rotatable saw blade mounted on the end of said saw support adjacent said log and movable into and out of engagement with said log for cutting through said log, a pivotal plate positioned between said inclined table and the lower end of said elevator conveyor, means for moving said pivotal plate relative to said inclined table for forming therewith a V-trough for supporting said log during the cutting thereof, said plate moving means pivoting said plate downwardly after the cutting of said log, said log thereafter falling off said inclined table onto the elevator conveyor so as to be engaged by the spaced lugs thereon for movement from the lower end of said elevator conveyor to the upper end thereof from whence said log is discharged over the upper end of said elevator conveyor, a pivotal ejector plate mounted between said first and second pairs of lugs adjacent the lower end of said elevator conveyor, means for moving said pivotal ejector plate outwardly with respect to said elevator conveyor for ejecting therefrom any log passing over said pivotal ejector plate, a boom projecting vertically and transversely outwardly from said one side of said frame, a pulley means mounted to the upper end of said boom, a cable extending over said pulley and having a hook means at the outer free end thereof, a rotatable winch connected with the other end of said cable for winding up or paying out said cable whereby said hook means is engageable with a log for the purpose of directing said log into engagement with said feed roller.

No references cited.

WILLIAM W. DYER, JR., *Primary Examiner.*

W. D. BRAY, *Assistant Examiner.*